(12) United States Patent
Yun et al.

(10) Patent No.: US 7,340,006 B2
(45) Date of Patent: Mar. 4, 2008

(54) APPARATUS AND METHOD FOR REDUCING PAPR IN OFDM COMMUNICATION SYSTEM

(75) Inventors: Sung-Ryul Yun, Chungcheongbuk-do (KR); Sung-Eun Park, Suwon-si (KR); Jae-Yoel Kim, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 693 days.

(21) Appl. No.: 10/937,241

(22) Filed: Sep. 9, 2004

(65) Prior Publication Data

US 2005/0100108 A1 May 12, 2005

(30) Foreign Application Priority Data

Sep. 9, 2003 (KR) .................. 10-2003-0063312

(51) Int. Cl.
*H04K 1/02* (2006.01)
(52) U.S. Cl. ......................... 375/296; 375/260
(58) Field of Classification Search ................ 375/260, 375/296, 297
See application file for complete search history.

(56) References Cited

U.S. PATENT DOCUMENTS 6,147,984 A 11/2000 McCoy
6,301,268 B1 10/2001 Laroia et al.
6,654,431 B1 * 11/2003 Barton et al. ............... 375/346

FOREIGN PATENT DOCUMENTS

EP         1 261 156    11/2002
KR   10-2002-0096833   12/2002

OTHER PUBLICATIONS

Henkel et al., "PAR Reduction Revisited: An Extension to Tellado's Method", 6th International OFDM-Workshop, 2001, pp. 31-1-31-6.
Tellado et al., "Efficient Algorithms for Reducing PAR in Multicarrier Systems", 1998 IEEE, p. 191.
Salvekar et al., "Peak-to-Average Power Ratio Reduction for Block Transmission Systems in the Presence of Transmit Filtering", 2001 IEEE, pp. 175-178.

* cited by examiner

*Primary Examiner*—Kevin Kim
(74) *Attorney, Agent, or Firm*—The Ferrell Law Firm, P.C.

(57) ABSTRACT

A method for reducing a peak-to-average power ratio (PAPR) in an orthogonal frequency division multiplexing (OFDM) communication system including N carriers, among which L carriers are allocated to L reserved tones and data are carried by (N-L) remaining tones, wherein L is smaller than N, including generating an impulse signal from the L reserved tones; converting a phase of the generated impulse signal into a phase of a signal having a maximum peak value from among complex output signals obtained though inverse fast Fourier transform (IFFT) of the N carriers; scaling the generated impulse signal by the difference between the maximum peak value and a target power value; and complex-adding the scaled signal and the complex output signal after IFFT.

12 Claims, 10 Drawing Sheets

APPARATUS AND METHOD FOR REDUCING PAPR IN OFDM COMMUNICATION SYSTEM

PRIORITY

This application claims priority to an application entitled "Apparatus And Method For Reducing PAPR In OFDM Communication System" filed in the Korean Industrial Property Office on Sep. 9, 2003 and assigned Serial No. 2003-63312, the contents of which are hereby incorporated by reference.

BACKGROUND OF THE INVENTION

1. Field of the Invention

The present invention relates to an apparatus and a method for reducing a peak-to-average power ratio (hereinafter, referred to as "PAPR") in an Orthogonal Frequency Division Multiplexing (hereinafter, referred to as "OFDM") communication system, and more particularly to an apparatus and a method for reducing PAPR by means of a complex gradient algorithm.

2. Description of the Related Art

Recently, a fourth generation (4G) mobile telecommunication system is being developed from the third generation (3G) mobile telecommunication system. The fourth generation (4G) mobile telecommunication system aims not only to provide the same mobile telecommunication services as those by the mobile telecommunication systems of previous generations but also to effectively interconnect a wire communication network and a wireless communication network and provide a service combining wire and wireless communication networks. Further, the 4G mobile telecommunication system arranges standards for technologies for providing a higher speed data transmission service than the 3G mobile telecommunication system.

Here, OFDM scheme is being actively studied for its application to the 4G mobile telecommunication system, and it employs a data transmission scheme using multi-carriers. The OFDM scheme is one multi-carrier modulation scheme in which symbols inputted in series are serial-to-parallel converted so as to be modulated into a plurality of sub-carriers having orthogonality to each other, i.e., a plurality of sub-carrier channels, which are then transmitted.

OFDM is similar to conventional frequency division multiplexing (FDM) but has a different characteristic in that a plurality of sub-carriers are transmitted while maintaining orthogonality between them in the OFDM scheme so that the OFDM scheme can achieve an optimum transmission efficiency. In other words, the OFDM scheme has good efficiency in using frequencies and is highly resistant to multi-path fading, so that the OFDM scheme can achieve optimum transmission efficiency in high speed data transmission.

Hereinafter, constructions of transmission/reception terminals of a communication system employing conventional OFDM will be described with reference to FIG. 1.

FIG. 1 is a block diagram showing constructions of transmission/reception terminals of a conventional OFDM mobile communication system.

Referring to FIG. 1, a mobile communication system using OFDM scheme includes a transmission terminal 100 and a reception terminal 150. The transmission terminal 100 includes a data transmitter 102, a coder 104, a symbol mapper 106, a serial to parallel (hereinafter, referred to as "S/P") converter 108, a pilot symbol inserter 110, an inverse fast Fourier transform (hereinafter, referred to as "IFFT") unit 112, a parallel to serial (hereinafter, referred to as "P/S") converter 114, a guard interval inserter 116, a digital-to-analog converter (hereinafter, referred to as "D/A converter") 118, and a radio frequency (hereinafter, referred to as "RF") processor 120.

In the transmission terminal 100, the data transmitter 102 generates and outputs user data bits and control data bits to be transmitted to the coder 104. The coder 104 receives and codes the signals outputted from the data transmitter 102 according to a predetermined coding scheme, and then outputs the coded signals to the symbol mapper 106. The coder 104 may perform coding by means of a convolutional coding scheme or a turbo coding scheme having a predetermined coding rate. The symbol mapper 106 modulates the coded bits outputted from the coder 104 according to a corresponding modulation scheme, thereby generating modulation symbols, and outputs the modulation symbols to the S/P converter 108. Here, the modulation scheme that the symbol mapper 106 may follow includes, e.g., a BPSK (binary phase shift keying) scheme, a QPSK (quadrature phase shift keying) scheme, a 16QAM (quadrature amplitude modulation) scheme, 64QAM scheme, or others.

The S/P converter 108 receives and converts the serial modulation symbols outputted from the symbol mapper 106 into parallel modulation symbols, and outputs the converted parallel modulation symbols to the pilot symbol inserter 110. The pilot symbol inserter 110 inserts pilot symbols into the converted parallel modulation symbols outputted from the S/P converter 108 and then outputs them to the IFFT unit 112.

The IFFT unit 112 receives the signals outputted from the pilot symbol inserter 110, performs N-point IFFT for the signals, and then outputs them to the P/S converter 114.

The P/S converter 114 receives the signals outputted from the IFFT unit 112, converts the signals into serial signals, and outputs the converted serial signals to the guard interval inserter 116. The guard interval inserter 116 receives the signals outputted from the P/S converter 114, inserts guard intervals into the received signals, and then outputs them to the D/A converter 118. Here, the inserted guard interval prevents interference between OFDM symbols transmitted in the OFDM communication system; that is to say, the inserted guard interval prevents interference between a previous OFDM symbol transmitted during a previous OFDM symbol period and a current OFDM symbol to be transmitted during a current OFDM symbol period.

In inserting the guard interval, a method of inserting null data has been proposed. However, insertion of null data as a guard interval may cause a receiver to erroneously estimate a start point of an OFDM symbol, thereby allowing interference between sub-carriers, which increases the probability of erroneous determination of the starting point for received OFDM symbols. Therefore, a cyclic prefix method or a cyclic postfix method is usually used in inserting the guard interval. In the cyclic prefix method, a predetermined number of last bits of an OFDM symbol are copied and inserted into an OFDM symbol. In the cyclic postfix method, a predetermined number of initial bits of an OFDM symbol are copied and inserted into an OFDM symbol.

The D/A converter 118 receives the signals outputted from the guard interval inserter 116, converts the signals into analog signals, and outputs the converted analog signals to the RF processor 120. The RF processor 120 includes a filter and a front end unit. The RF processor 120 receives the signals from the D/A converter 118, RF-processes the signals, and then transmits the signals over the air through a Tx antenna.

Hereinafter, the reception terminal 150 will be described.

The reception terminal 150 includes an RF processor 152, an analog-to-digital converter (hereinafter, referred to as "A/D converter") 154, a guard interval remover 156, a S/P converter 158, a fast Fourier transform (hereinafter, referred to as "FFT") unit 160, a pilot symbol extractor 162, a channel estimator 164, an equalizer 166, a P/S converter 168, a symbol demapper 170, a decoder 172, and a data receiver 174.

The signals transmitted from the transmission terminal 100 pass through multi-path channels and are received by an Rx antenna of the reception terminal 150 in a state in which noise is included in the signals. The signals received through the Rx antenna are inputted to the RF processor 152, and the RF processor 152 down-converts the received signals into signals of an intermediate frequency (IF) band, and then outputs the IF signals to the A/D converter 154. The A/D converter 154 converts the analog signals outputted from the RF processor 152 into digital signals and then outputs the digital signals to the guard interval remover 156.

The guard interval remover 156 receives the digital signals converted by and outputted from the A/D converter 154, eliminates guard intervals from the digital signals, and then outputs them to the S/P converter 158. The S/P converter 158 receives the serial signals outputted from the guard interval remover 156, converts the serial signals into parallel signals, and then outputs the parallel signals to the FFT unit 160. The FFT unit 160 performs N-point FFT on the signals outputted from the P/S converter 158, and then outputs them to both the equalizer 166 and the pilot symbol extractor 162. The equalizer 166 receives the signals from the FFT unit 160, channel-equalizes the signals, and then outputs the channel-equalized signals to the P/S converter 168. The P/S converter 168 receives the parallel signals outputted from the equalizer 166, converts the parallel signals into serial signals, and then outputs the converted serial signals to the symbol demapper 170.

As indicated, the signals outputted from the FFT unit 160 are also inputted to the pilot symbol extractor 162. The pilot symbol extractor 162 detects pilot symbols from the signals outputted from the FFT unit 160 and outputs the detected pilot symbols to the channel estimator 164. The channel estimator 164 performs channel estimation using the pilot symbols and outputs the result of the channel estimation to the equalizer 166. Here, the reception terminal 150 generates channel quality information (hereinafter, referred to as "CQI") corresponding to the result of the channel estimation and transmits the CQI to the transmission terminal 100 through a CQI transmitter (not shown).

The symbol demapper 170 receives the signals outputted from the P/S converter 168, demodulates the signals according to a demodulation scheme corresponding to the modulation scheme of the transmission terminal 100, and then outputs the demodulated signals to the decoder 172. The decoder 172 decodes the signals from the symbol demapper 170 according to a decoding scheme corresponding to the coding scheme of the transmission terminal 100 and outputs the decoded signals to the data receiver 174.

However, the OFDM system not only has the advantages described above but is also problematic in that the multi-carrier modulation may cause a high PAPR in the OFDM system. That is, in the OFDM system, data is transmitted by means of multiple carriers, so that a resultant OFDM signal has an amplitude, which is equivalent to the sum of the amplitudes of all the carriers, and thus may largely change. In particular, when the multiple carriers have the same phase, the amplitude of the resultant OFDM signal may have a very large value and may fluctuate greatly. Therefore, the OFDM signal may go beyond an operation range of a high power linear amplifier (not shown) and thus may be distorted after passing the high power linear amplifier. In order to prevent this distortion, the high power linear amplifier employs a back-off method for allowing the signal to be maintained within the linear range by lowering an input power.

That is to say, in the back-off method, the operation point of the high power linear amplifier is lowered in order to reduce distortion of the signal. However, the larger the back off value is, the more inefficient the utilization of the amplifier is. Therefore, a signal having a high PAPR may deteriorate the efficiency of the linear amplifier.

Typical methods for reducing a PAPR in an OFDM communication system include clipping, block coding, phase adjustment, and tone reservation (hereinafter, referred to as "TR").

In the clipping method, in order to allow a signal to have an amplitude within a linear operation range of an amplifier, when the amplitude of the signal exceeds a predetermined reference clipping value set in advance, a portion of the amplitude of the signal exceeding the reference clipping value is clipped out. However, in the clipping method, non-linear operation may cause in-band distortion, thereby increasing inter-symbol interference and bit error rate. Further, in the clipping method, out-band noise may cause channel interference, thereby deteriorating spectrum efficiency.

In the block coding method, extra carriers are coded and then transmitted, in order to lower the PAPR of all the carrier signals. In this method, the coding of the extra carriers achieves the correction of errors and reduction of the PAPR without distortion of the signal. However, when sub-carriers have large amplitudes, this method yields a very bad spectrum efficiency and requires a large look-up table or a large generation matrix, increasing and greatly complicating calculations.

The phase adjustment method includes a partial transmit sequence (hereinafter, referred to as "PTS") method and a selective mapping (hereinafter, referred to as "SLM") method.

In the PTS method, input data is divided into M sub-blocks, each of the M sub-blocks is subjected to L-point IFFT and is then multiplied by a phase factor for minimizing the PAPR, and then the M sub-blocks are summed and transmitted.

In the SLM method, the same M data blocks are multiplied by different phase sequences having statistically independent N lengths, and one of the multiplied blocks, which has the lowest PAPR, is selected and transmitted. The SLM method requires M IFFT procedures but can considerably lower the PAPR and can be applied to all the carriers regardless of the number of the carriers.

However, both the PTS method and the SLM method are problematic in that additional information on rotation factors must be transmitted to a receiver in order to restore data. Such a transmission of the additional information complicates the communication method and causes all OFDM symbol information within a corresponding period containing an erroneous symbol to be treated as erroneous.

Meanwhile, in the TR method, some tones from among the entire sub-carriers, which carry no data, are reserved for PAPR reduction. Here, the receiver disregards the tones carrying no information signal and restores information signals from the other tones. Therefore, the receiver may have a simpler construction.

The gradient algorithm is a good solution for the TR method. In the gradient algorithm, which is an application of the clipping method to the TR method, signals having an impulse characteristic are generated using the tones carrying no information signal, and IFFT output signals are clipped using the signals having the impulse characteristic. When the generated signals having an impulse characteristic are added to the IFFT output signals, data distortion occurs only in some tones carrying no information but does not occur in the other tones of frequency domain.

Hereinafter, the TR method using the gradient algorithm will be described with reference to FIG. 2.

FIG. 2 illustrates a construction of a transmitter using the conventional TR method.

Referring to FIG. 2, a total of N sub-carriers outputted through the S/P converter 108 of FIG. 1 include L tone signals 201 and (N-L) information signals 203. Here, the information signals refer to user data bits and control data bits. Further, the L reserved tone signals carrying no information produce a waveform having an impulse characteristic and are used to clip the output signals of the IFFT unit 112.

The (N-L) number of the information signals 203 and the L number of the reserved tone signals 201 are inputted to a tone allocation unit 205. The tone allocation unit 205 allocates the L reserved tone signals 201 to positions of sub-carriers reserved in advance between the transmitter and the receiver. In other words, the tone allocation unit 205 allocates the L reserved tone signals 201 to reserved L positions, allocates (N-L) tones or (N-L) information signals 203 to the remaining (N-L) positions, and then outputs them to an N-point IFFT unit 207.

The N-point IFFT unit 207 receives all allocated tone signals, performs an IFFT operation on them, and then outputs them to a parallel-serial converter 209. The parallel-serial converter 209 receives the parallel signals having been subjected to the IFFT operation, converts the parallel signals into serial signals, and then outputs the converted serial signals to a gradient algorithm unit 211. Here, when the converted serial signals are assumed to be x, x represents signals of the time domain. The gradient algorithm unit 211 generates a signal c of the time domain, adds the signals c and x, and then outputs a transmission signal, which is the sum of the signals c and x.

Herein, the signal c used for reduction of the PAPR can be expressed as Equation 1.

$$C_k = \begin{cases} C_k, & k \in \{i_1, i_2, \cdots, i_L\} \\ 0, & k \notin \{i_1, i_2, \cdots, i_L\} \end{cases} \quad (1)$$

In Equation 1, L sub-carriers are reserved in advance and used for the signal C, and the locations $\{i_1, \ldots, i_L\}$ of the L sub-carriers are fixed by the tone allocation unit 205 at the time of initial transmission. Further, in Equation 1, i represents indices of reserved tone signals in the tone allocation unit 205 and k represents indices of frequency domain. Herein, input signals X are allocated to the sub-carriers other than signals c in the manner as expressed by Equation 2.

$$X_k = \begin{cases} X_k, & k \notin \{i_1, i_2, \cdots, i_L\} \\ 0, & k \in \{i_1, i_2, \cdots, i_L\} \end{cases} \quad (2)$$

Hereinafter, the conventional gradient algorithm as described above will be described in detail with reference to FIG. 3, which is a block diagram of an apparatus for reducing PAPR using the conventional gradient algorithm.

Referring to FIG. 3, an apparatus for reducing PAPR using the conventional gradient algorithm includes a p waveform generator 301, a peak detector 303, a circular shift unit 305, a scaling unit 307, an adder 309, a PAPR calculation unit 311, and a control unit 313.

First, the p waveform generator 301 generates a p waveform from the L tones 201, positions of which have been reserved in the tone allocation unit 205, from among the total N signals. The p waveform is a signal similar to an impulse signal, which has been obtained through several hundred thousand times to several million times of repetitive random selections of at least one tone having no information from among the entire signals.

Meanwhile, the serial signals x of the time domain, which have been converted from analog signals after being subjected to IFFT, are inputted to the gradient algorithm unit 211. The peak detector 303 detects the maximum peak value and the peak position of the signals x inputted to the gradient algorithm unit 211. The circular shift unit 305 circularly shifts the location of the p waveform to the detected maximum peak position. The scaling unit 307 scales the maximum peak value of the signals x with the circularly shifted p waveform so that the maximum peak value of the signals x outputted after being subjected to IFFT can be maintained below a PAPR value set in advance by the system. Here, if a scaled value for lowering the maximum peak value below the predetermined PAPR is c, it can be said that c is an optimum value calculated by the gradient algorithm unit 211 in order to eliminate the peak value of the output signal x of the N-point IFFT unit 207.

The adder 309 adds the signals x and c and outputs the sum to the PAPR calculation unit 311. The PAPR calculation unit 311 calculates a PAPR for the inputted signal x+c and transmits the calculated value to the control unit 313.

The control unit 313 receives the calculated PAPR value, and feedbacks the PAPR value and repeatedly performs the gradient algorithm when the calculated PAPR value is larger than the PAPR value set in the system. Such feedback of the PAPR value and re-execution of the gradient algorithm are repeated until the calculated PAPR value becomes smaller than the PAPR value set in the system. However, in order to prevent infinite repetition, the system has a preset maximum limit for the number of times of repetition and transmits the signal when the gradient algorithm has been repeatedly executed by the preset times even though the calculated PAPR is larger than the PAPR set in the system.

When it is assumed that an N-point IFFT output value is a complex number a+bi (where $i=\sqrt{-1}$), the conventional gradient algorithm takes only the real number term into account (b=0). However, it is preferred that the OFDM system uses all sub-carriers for high speed data transmission. When all the sub-carriers are used, the IFFT output has a value of a complex number, and it is thus impossible to employ the conventional gradient algorithm controlling the amplitude of the signal only for the real number term.

Further, in the gradient algorithm, in order to enable the IFFT output signal to have a real number, the input data in the frequency domain must be symmetrical and conjugate. When the outputs after the IFFT in the frequency domain are symmetrical and conjugate, they have the same amplitude and a phase difference of 180°, so that the imaginary number term b becomes zero. Therefore, the conjugate portions cannot carry data, and thus throughput of the system is lowered to one-half capacity. Therefore, the conventional gradient algorithm reflecting only the real number term has a low throughput and is thus inefficient for high speed data transmission.

SUMMARY OF THE INVENTION

Accordingly, the present invention has been made to solve the above-mentioned problems occurring in the prior art, and an object of the present invention is to provide an apparatus and a method for reducing a PAPR by means of a complex gradient algorithm in an OFDM mobile communication system.

It is another object of the present invention to provide an apparatus and a method for transmitting data at a high speed by means of a complex gradient algorithm in an OFDM mobile communication system.

In order to accomplish this object, there is provided an apparatus for reducing a peak-to-average power ratio (PAPR) in an orthogonal frequency division multiplexing (OFDM) communication system including N carriers, among which L carriers are allocated to L reserved tones and data is carried by (N-L) remaining tones, wherein L is smaller than N, the apparatus including a complex gradient calculation unit, which generates an impulse signal from the L reserved tones, phase-shifts the impulse signal, scales the impulse signal, and complex-operates the impulse signal with a complex output signal obtained through IFFT of the N carriers, thereby lowering a maximum peak value from among complex output signals below a target power value.

In accordance with another aspect of the present invention, there is provided a method for reducing a peak-to-average power ratio (PAPR) in an orthogonal frequency division multiplexing (OFDM) communication system including N carriers, among which L carriers are allocated to L reserved tones and data is carried by (N-L) remaining tones, wherein L is smaller than N, the method including generating an impulse signal from the L reserved tones; converting a phase of the generated impulse signal into a phase of a signal having a maximum peak value from among complex output signals obtained through inverse fast Fourier transform (IFFT) of the N carriers; scaling the generated impulse signal by the difference between the maximum peak value and a target power value; and complex-adding the scaled signal and the complex output signal after IFFT.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
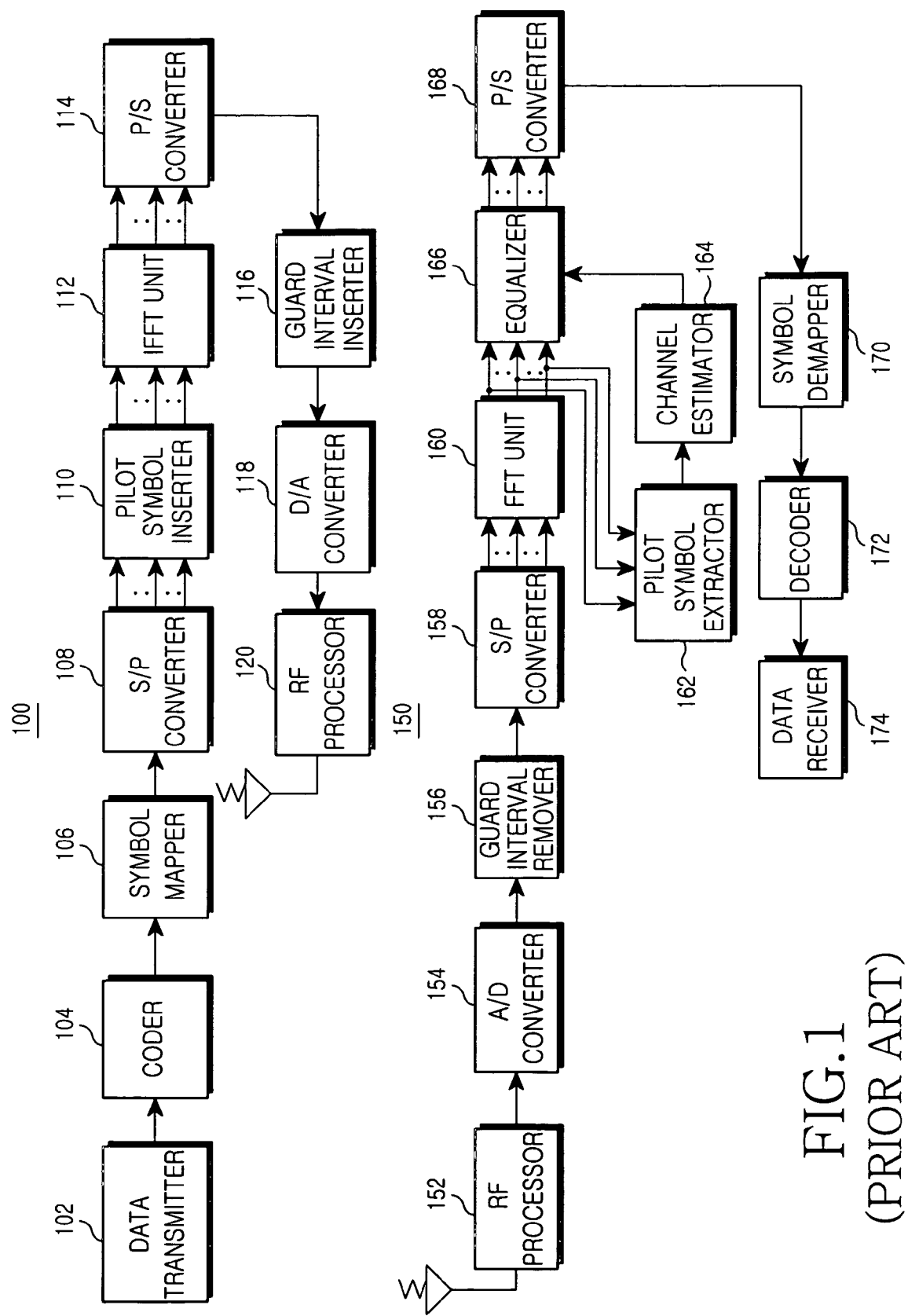
FIG. 1 is a block diagram showing constructions of transmission/reception terminals of a conventional OFDM mobile communication system.
Figure 2:
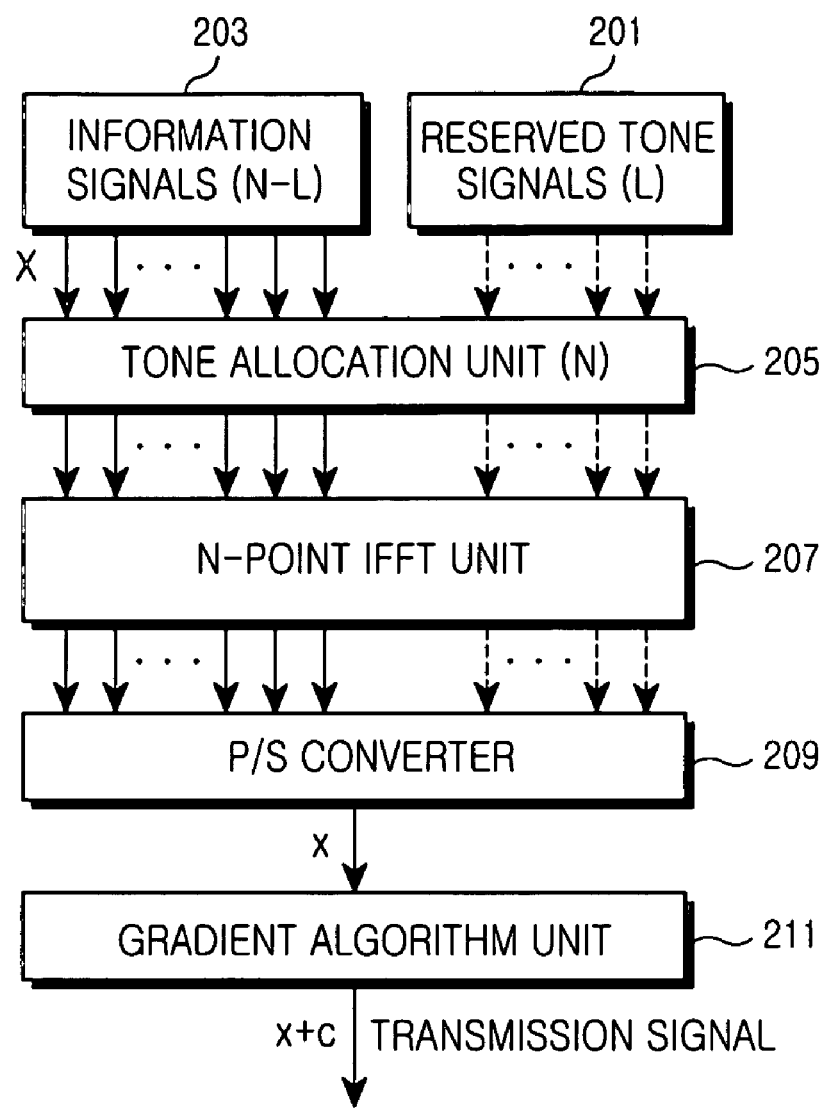
FIG. 2 illustrates a construction of a transmitter employing the conventional TR method.
Figure 3:
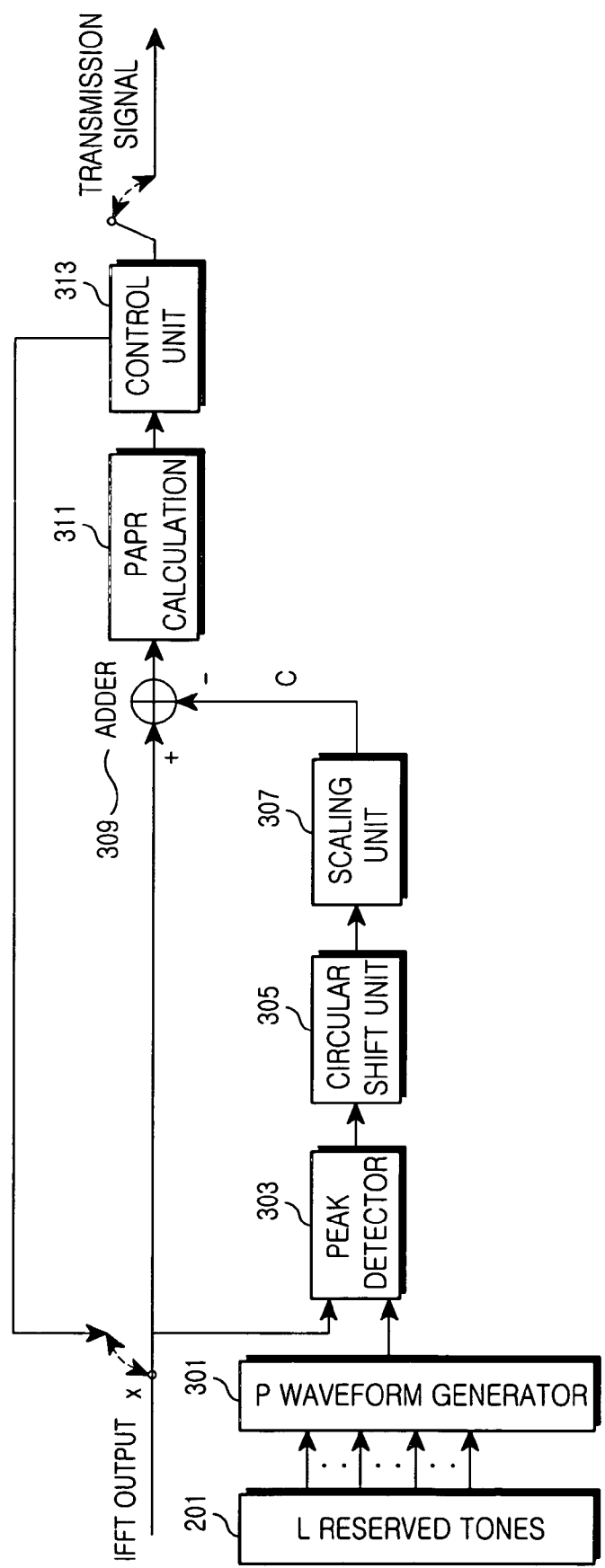
FIG. 3 shows a block diagram of an apparatus for reducing PAPR using the conventional gradient algorithm.

Hereinafter, preferred embodiments of the present invention will be described with reference to the accompanying drawings. In the following description, a detailed description of known functions and configurations incorporated herein will be omitted when it may make the subject matter of the present invention unclear.

The present invention embodies an apparatus and a method for reduction of a PAPR in a mobile communication system employing an OFDM scheme. In particular, the present invention sets forth an apparatus and a method using a complex gradient algorithm, thereby reducing a PAPR while increasing a transmission rate.

First, a reason for generating the p waveform and a method of reducing the PAPR using the p waveform will be described.

When $x^{clip}$ represents a vector for x having been clipped to a certain level, the vector satisfies a relation, $$x - x^{clip} = \sum_i \beta_i \delta[n - m_i].$$

In the relation, i denotes the number of repetitions, $\beta$ refers to a clipping value, and $m_i$ refers to the clipped position. In addition, "$\delta$" denotes a delta function, and "n" denotes a time sample value. In the relation, when $$c = -\sum_i \beta_i \delta[n - m_i], \ x + c = x^{clip}.$$

Therefore, it is noted that the peak value of the output signal of the N-point IFFT unit 207 can be reduced to $x^{clip}$ by the signal c. Therefore, the signal c can be interpreted to be the sum of delayed and scaled impulse functions.

However, in the frequency domain, the signal has a value other than zero at most frequency positions, and data symbols located at other positions than the reserved L positions have distorted values. Therefore, a function having a characteristic of an impulse function in the time domain needs to be generated and used for clipping, instead of the ideal impulse function.

Assuming that $1_L$ represents a vector having a value of 1 at the reserved L positions and a value of 0 at the other positions, then the vector meets a relation, $$p = p[n] = [p_0 p_1''' p_{N-1}] = \frac{\sqrt{N}}{L} \, IFFT(1_L).$$

In the relation, $p_0$ is 1, and each of $p_1$ to $p_{N-1}$ has a value considerably smaller than $p_0$. In the case of a signal having the characteristic of the ideal impulse function, each of $p_1$ to $p_{N-1}$ has a value of 0. Therefore, change of the peak of the IFFT output signal must be minimized by selecting small values for $p_1$ to $p_{N-1}$.

Next, a peak detector detects positional information of the maximum peak value $m_i$ from the output signal x of the IFFT, and a circular shift unit circularly shifts an impulse waveform or a quasi-impulse waveform, which has been generated in advance using the L tones, to the position of the $m_i$. That is, as noted from $p[((n-m_i))_N]$ representing a value for the circular shift of the impulse waveform or the quasi-impulse waveform to the position of the maximum peak value $m_i$, the circular shift process causes the maximum peak position of the output signal x of the IFFT to coincide with the position $p_0$ having the maximum value in the preliminarily generated impulse waveform and causes the output signal x to be scaled by the amplitude of the p waveform so that the output signal x has a reduced peak value.

Meanwhile, according to the conventional real gradient algorithm, the impulse waveform also must have a real value, so that the L allocated tones must be located symmetrically and be conjugate. In contrast, in the complex gradient algorithm according to the present invention, the impulse waveform can be generated without the limitation requiring the waveform to have a real value, so that a waveform nearly equal to an ideal impulse can be generated.

Figure 4:
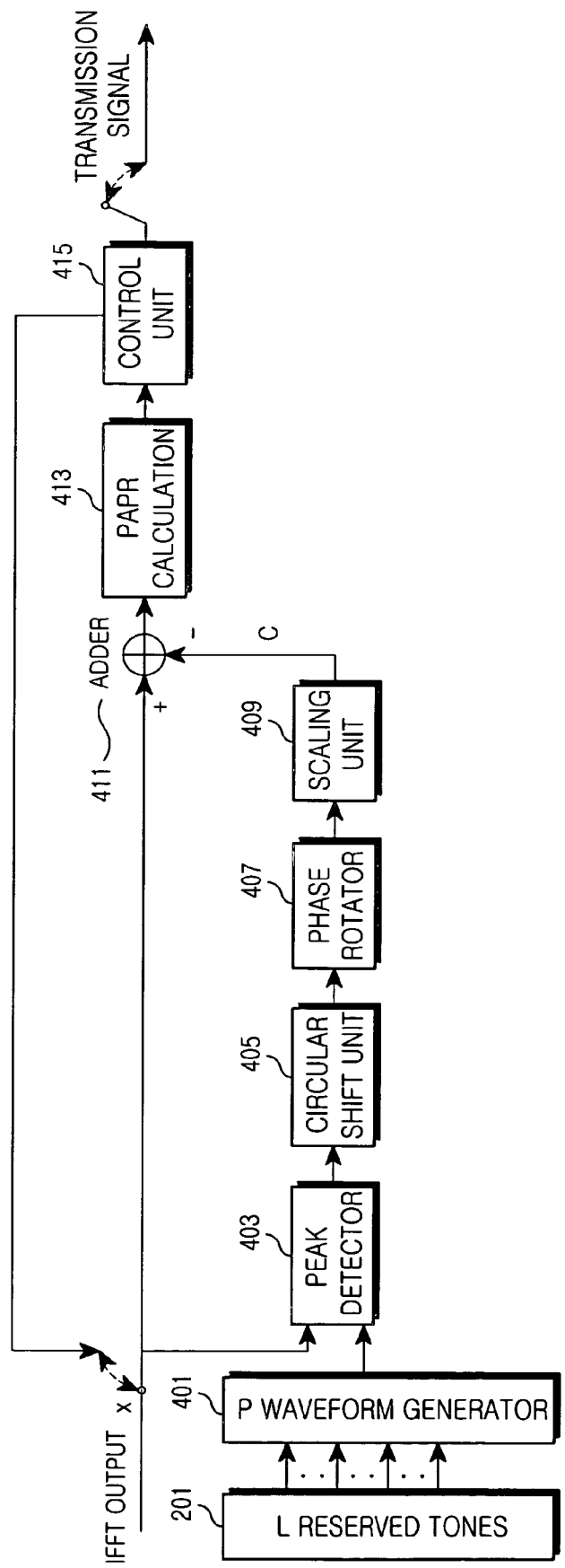
FIG. 4 shows a block diagram of an apparatus for reducing PAPR using a complex gradient algorithm according to the present invention.

FIG. 4 shows a block diagram of an apparatus for reducing PAPR using a complex gradient algorithm according to the present invention.

Referring to FIG. 4, an apparatus for reducing PAPR using a complex gradient algorithm according to the present invention includes a p waveform generator 401, a peak detector 403, a circular shift unit 405, a phase rotator 407, a scaling unit 409, a complex adder 411, a PAPR calculation unit 413, and a control unit 415.

The p waveform generator 401 generates a p waveform having an impulse characteristic from the reserved L tones 201 except for the information signals, the (N-L) tones, from among all the N signals.

The p waveform is a signal similar to an impulse signal, which has been obtained through several hundred thousand times to several million times of repetitive random selections of at least one tone having no information from among the entire signals.

Meanwhile, the signals x of the time domain outputted after IFFT processing are inputted to the peak detector 403. The peak detector 403 detects the maximum peak value of the signals x. The circular shift unit 405 circularly shifts the location of the p waveform to the detected maximum peak value. The phase rotator 407 rotates the phase of the circularly shifted p waveform until it coincides with the phase of the maximum peak value. The scaling unit 409 scales the peak value of the signals x with the circularly shifted p waveform so that the maximum peak value of the signals x can be lowered below a PAPR value set in advance in the system. Here, if a scaled value for lowering the maximum peak value below the predetermined PAPR value is c, it can be said that c is a scaling value for reducing the maximum peak value of the signals x.

The complex adder 411 receives the output signals x after the IFFT and the value c calculated in order to reduce the maximum peak value of the p waveform below the PAPR value set by the system. Then, the complex adder 411 adds the signals x and c and outputs the sum x+c to the PAPR calculation unit 413. The PAPR calculation unit 413 calculates a PAPR for the inputted signal x+c and transmits the calculated value to the control unit 415.

The control unit 415 receives the calculated PAPR and feeds back its output to repeat the above process until the calculated PAPR becomes smaller than the PAPR set in the system. However, in order to prevent infinite repetition, the system has a preset maximum limit for the number of times of repetition and transmits the signal when the execution of the above process has been repeated for the preset number of times even though the calculated PAPR is larger than the PAPR set in the system.

Figure 5:
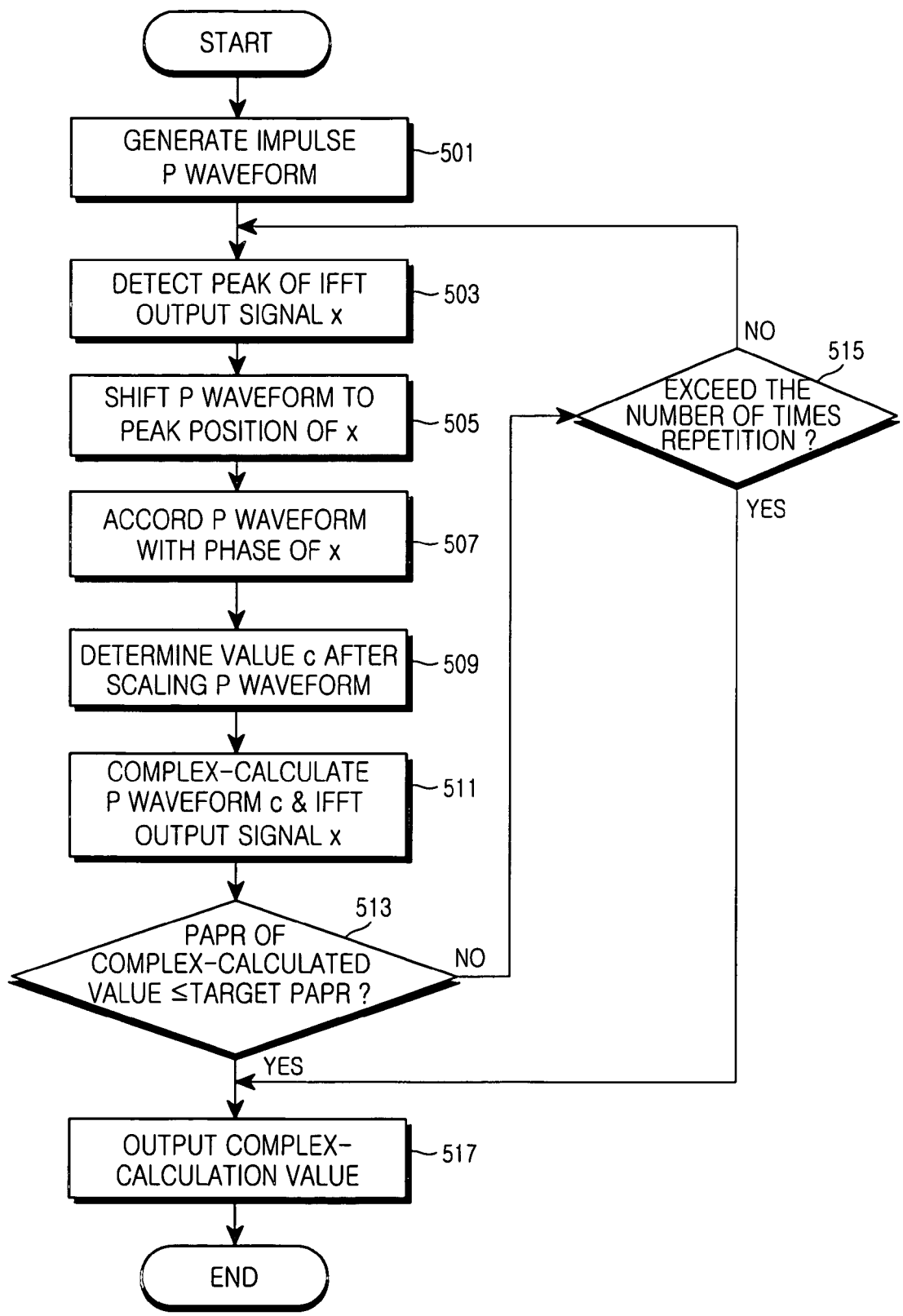
FIG. 5 shows a flowchart of a process for executing a complex gradient algorithm according to the present invention.

FIG. 5 shows a flowchart of a process for executing a complex gradient algorithm according to the present invention.

Referring to FIG. 5, the p waveform generator 401 generates a p waveform having an impulse characteristic from L tones having reserved positions from among all the N carriers in step 501. In step 503, the peak detector 403 detects peak portions exceeding the PAPR p value reset by the system for the time domain output signals x of the IFFT. In step 505, the circular shift unit 405 circularly shifts the p waveform to the position of the detected peak value. In step 507, the phase rotator 407 rotates the phase of $p_0$ having the p waveform with the impulse characteristic by the phase of the maximum peak value $x_k$, thereby causing the two phases to coincide with each other. Here, the phase of the maximum peak value $x_k$ can be obtained through normalization. Further, $p_0$ ideally has a value having a power of 1. Therefore, the phase rotation of $p_0$ can be achieved by complex-multiplying $p_0$ by $$\frac{x_k}{|x_k|}.$$

As a result, $p_0$ can have the same phase as that of the maximum peak value $x_k$. In step 509, the maximum peak value $x_k$ is scaled with the $p_0$ waveform so that the maximum peak value $x_k$ is lowered below the PAPR value preset by the system.

Here, a process of obtaining c in order to lower the peak value of the output signal x is as follows.

(1) An initial value is set as $c^{(0)}=[0 \ldots 0]^T=0_N$.

(2) A maximum peak value and its position of $|x_k+c_k^{(i-1)}|$ are obtained. When the maximum peak value is smaller than the PAPR value preset by the system, the control unit 415 transmits $x+c^{(0)}$. When the maximum peak value is not smaller than the PAPR preset by the system, the following step (3) is executed.

(3) The value c is calculated by Equation 3.

$$c^{(i)}=c^{(i-1)}-\alpha_i p[((n-m_i))_N] \tag{3}$$

In Equation 3, $m_i$ denotes the position of the peak value and $\alpha_i$ denotes a value for the phase rotation and scaling. $m_i$ and $\alpha_i$ are expressed by Equation 4.

$$m_i = Arg \, \max |x_n + c_n^{(i)}|$$

$$\alpha_i = \frac{x_{m_i} + c_{m_i}^{(i)}}{|x_{m_i} + c_{m_i}^{(i)}|}(|x_{m_i} + c_{m_i}^{(i)}| - A) \quad (4)$$

(4) Steps (2) and (3) are repeated.

An output signal of the PAPR calculation unit 413 after repeating steps (2) and (3) j times set in advance is expressed by Equation 5.

$$x + c^{(j)} = x - \sum_{i=1}^{j} \alpha_i p[((n - m_i))_N] \quad (5)$$

In other words, the PAPR calculation unit 413 calculates x+c in step 511. In step 513, when the result of the calculation is smaller than or equal to the preset PAPR value, the control unit 415 stops the repetition and performs step 517. In step 517, the control unit 415 outputs a complex operation value satisfying the conditions by the preset PAPR value. In contrast, when the result of the calculation is larger than the preset PAPR value, step 515 is performed. In step 515, the control unit 415 determines whether the number of times of the repetition exceeds a number of times preset by the system. When the number of times of repetition exceeds the number of times preset by the system, the control unit 415 outputs a current complex operation value. If not, steps 503 to 515 are repeated.

FIGS. 6A to 6E are graphs sequentially showing a process of reducing the peak value on a complex plane according to the present invention.

Figure 6A:
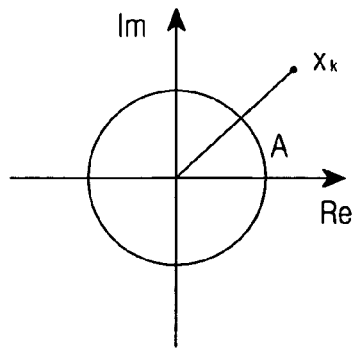
FIGS. 6A to 6E are graphs sequentially showing a process of reducing the peak value on a complex plane according to the present invention.

FIG. 6A is a graph showing the maximum peak value $x_k$ of the output signal x of the N-point IFFT unit 207. In the case of a complex value, minimization of the PAPR refers to locating all peak values of x within a circle by reducing the distance between x and the origin of the circle on the complex plane. Therefore, the p waveform is used in order to locate the maximum peak value $x_k$ within the circle.

Figure 6B:
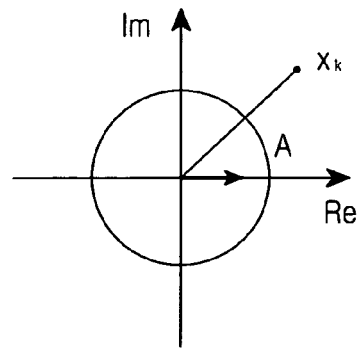

FIG. 6B is a graph showing a p waveform generated from L allocated tones, which has $p_0$ of 1 and an initial phase of 0°.

Figure 6C:
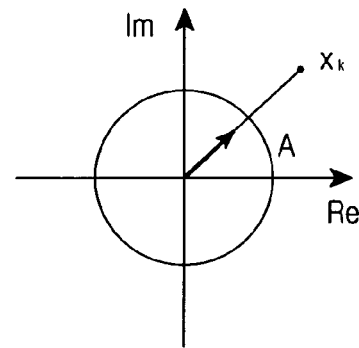

FIG. 6C is a graph showing $p_0$ having been rotated in the complex plane by the phase of the maximum peak value $x_k$. The phase rotation can be achieved by complex-multiplying $p_0$ by $$\frac{x_k}{|x_k|}.$$

Figure 6D:
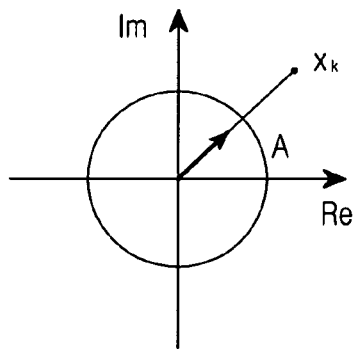

FIG. 6D is a graph showing the maximum peak value $p_0$ having been scaled in order to reduce the peak value to target level A.

Figure 6E:
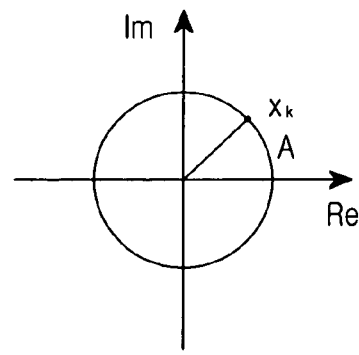

FIG. 6E is a graph showing a signal having been reduced to the target level A through addition of the scaled $p_0$ to the signal $x_k$.

Hereinafter, a process of reducing a PAPR below a PAPR value set in advance a system by applying the complex gradient algorithm will be described in detail with reference to specific examples.

In the examples shown in FIGS. 7A through 7F, a 256-point IFFT has been used, 26 L tones have been allocated, and 7 dB has been set in advance as the limit PAPR by the system. The PAPR value preset by the system is only a value randomly selected for simulation and can be changed in implementation of an actual system. Further, each horizontal axis in FIGS. 7A through 7F represents IFFT indices from 0 to 255, and each vertical axis thereof represents power of each IFFT output value. That is, when an output value of the IFFT has a complex value in a form of a+bi (i=[$\sqrt{-1}$]), the vertical axis represents a value of $a^2+b^2$.

FIGS. 7A through 7F are graphs showing the waveform change in the process of applying the complex gradient algorithm according to the present invention.

Figure 7A:
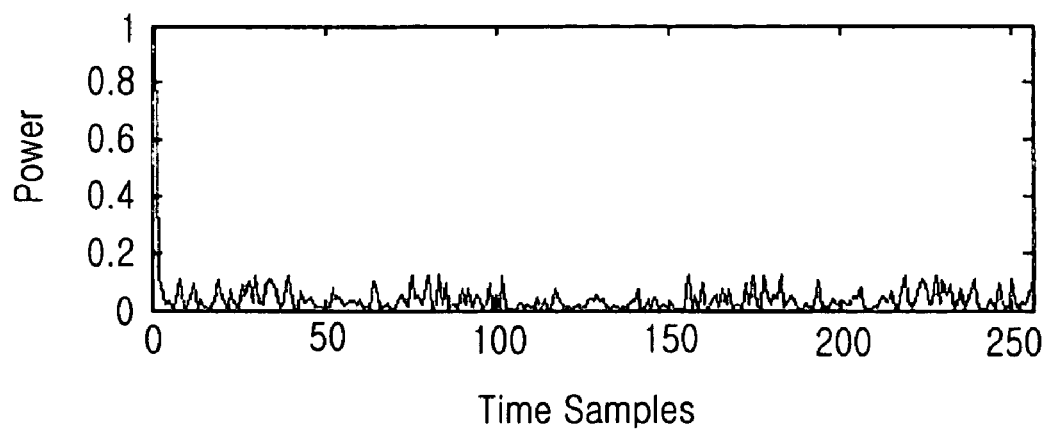
FIGS. 7A through 7F are graphs showing waveform change in the process of applying the complex gradient algorithm according to the present invention.

FIG. 7A is a graph showing a p waveform having an impulse characteristic, which has been generated from 26 L tones.

In obtaining the p waveform, random selection of 26 L tones from the 256 tones is repeated 1,000,000 times, and a case from among the one million time repetition, in which $p_1$ to $p_{N-1}$ except for the peak value $p_0$ have the smallest power value, is selected. Further, $p_0$ having the maximum peak value is normalized to 1 by multiplying p by $$\frac{\sqrt{N}}{L}.$$

Figure 7B:
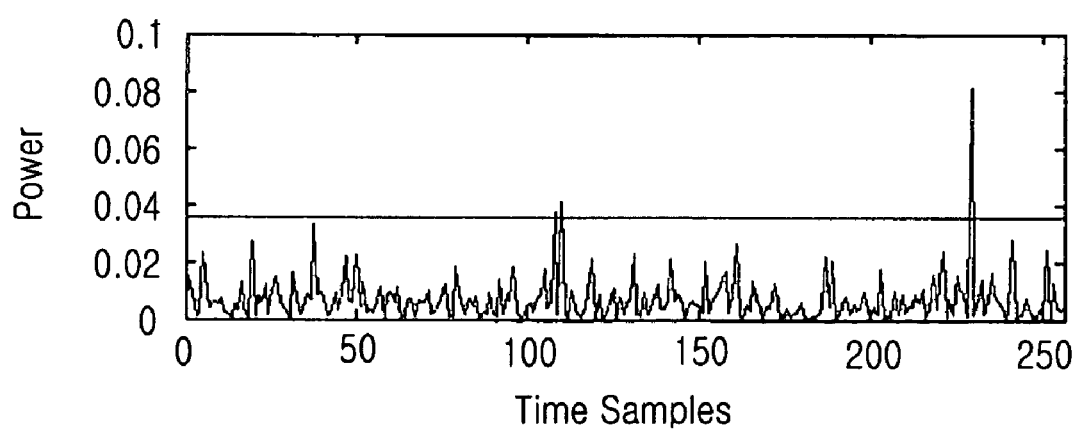

FIG. 7B is a graph showing a waveform of a complex output signal x after IFFT.

In the graph shown in FIG. 7B, the output signal x has a PAPR of 10.62 dB. The peak detector 403 detects the maximum peak value and its position for the output signal x. Since the detected maximum peak value is larger than 7 dB which is a limit level, a complex gradient algorithm is applied in order to lower the detected maximum peak value below the limit PAPR set in advance by the system. The detected maximum peak value takes the $229^{th}$ position on the time axis. The detected position of the maximum peak value is inputted to the circular shift unit 405.

Figure 7C:
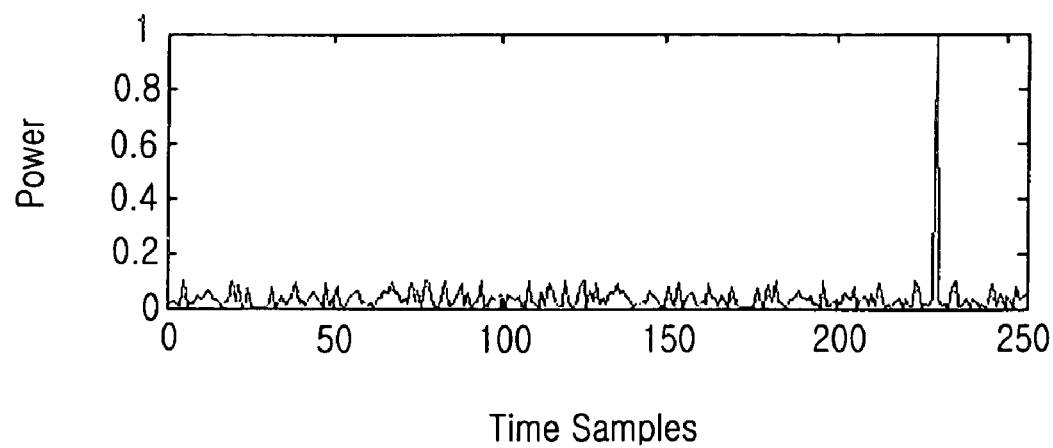

FIG. 7C is a graph showing a p waveform shifted to the position of the maximum peak value.

The graph of FIG. 7C shows the p waveform of FIG. 7A having been circularly shifted 229 times to the position ($m_1$=229) which is the position of the maximum peak value of the complex output signal x. The phase rotator 407 rotates the phase of the p waveform having an impulse characteristic by the amount of the phase of the peak value through the process shown in FIG. 6C. In the phase rotation, a complex value $$\frac{x_{m_2} + c_{m_2}^{(2)}}{|x_{m_2} + c_{m_2}^{(2)}|}$$

representing the phase of the peak is obtained and is then multiplied to the p vector, so that the phases can be accorded to each other.

Figure 7D:
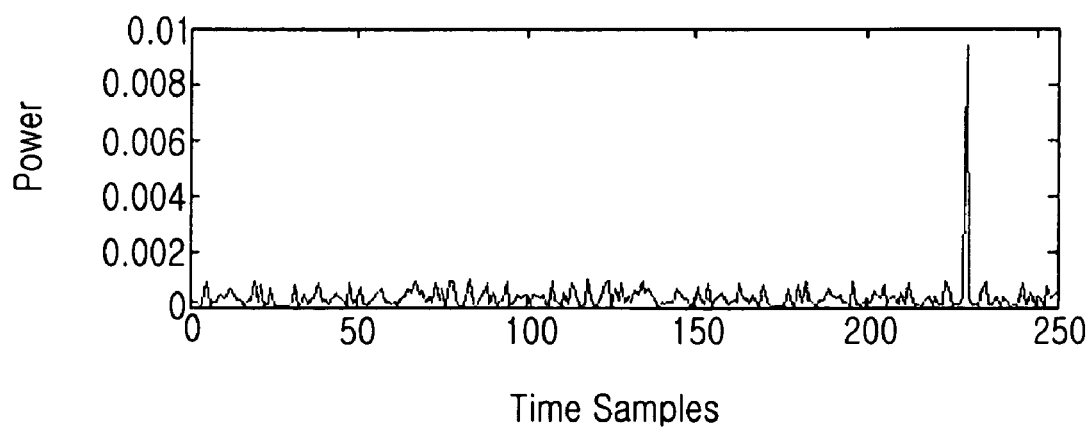

FIG. 7D is a graph showing the scaled p waveform.

The scaling unit 409 obtains a value c in order to lower the maximum peak value of the output signal x of the IFFT unit 413 below the PAPR value preset by the system. Here, the scaling value is $(|x_{m_1}+c_{m_1}^{(1)}|-A)$. Therefore, FIG. 7D shows a c waveform having been circularly shifted, phase-rotated, and scaled, which is expressed by $c^{(1)}=-\alpha_1 p[((n-m_1))_N]$.

Figure 7E:
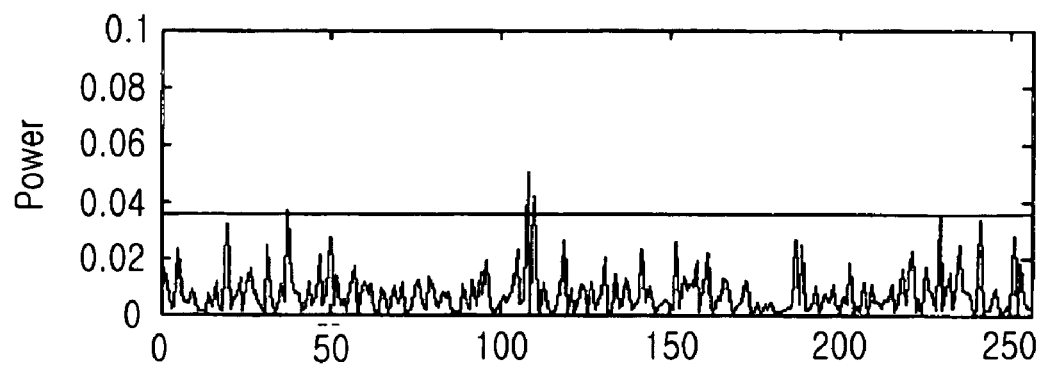

FIG. 7E is a graph showing a waveform $x+c^{(1)}$ after the complex gradient algorithm is performed one time, which is obtained through addition of the output signal x of FIG. 7B and the scaled waveform $c^{(1)}$ by the complex adder 411. It is noted from FIG. 7E that the peak value located at the 229$^{th}$ sample is reduced to the desired PAPR value preset by the system. However, the PAPR of waveform $x+c^{(1)}$ having been subjected one time to the gradient algorithm with another peak value at another position is 8.53 dB. Therefore, since the obtained PAPR exceeds 7 dB, which is the PAPR value preset by the system, the above process for reducing the PAPR is repeatedly executed, until the obtained PAPR is less than or equal to the preset PAPR value.

A graph satisfying the PAPR after repeated execution of the gradient algorithm 30 times will now be described with respect to FIG. 7F, which is a graph showing a waveform $x+c^{(30)}$ after the gradient algorithm is repeatedly executed 30 times.

Figure 7F:
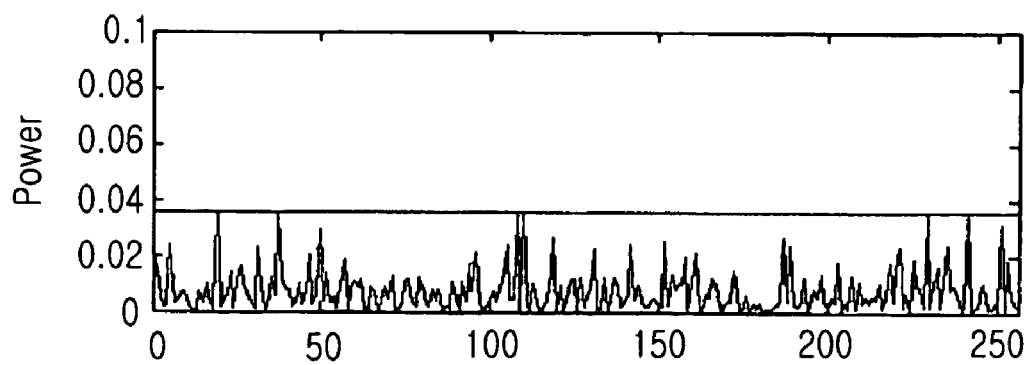

It is noted from FIG. 7F that the PAPR of the output signal waveform $x+c^{(30)}$ is 7.00 dB, thus satisfying the PAPR value preset by the system.

Therefore, since an OFDM system using the complex gradient algorithm transmits data to all sub-carriers except for the L tones allocated to reserved positions, the OFDM system can improve the transmission rate while reducing the PAPR.

Figure 8:
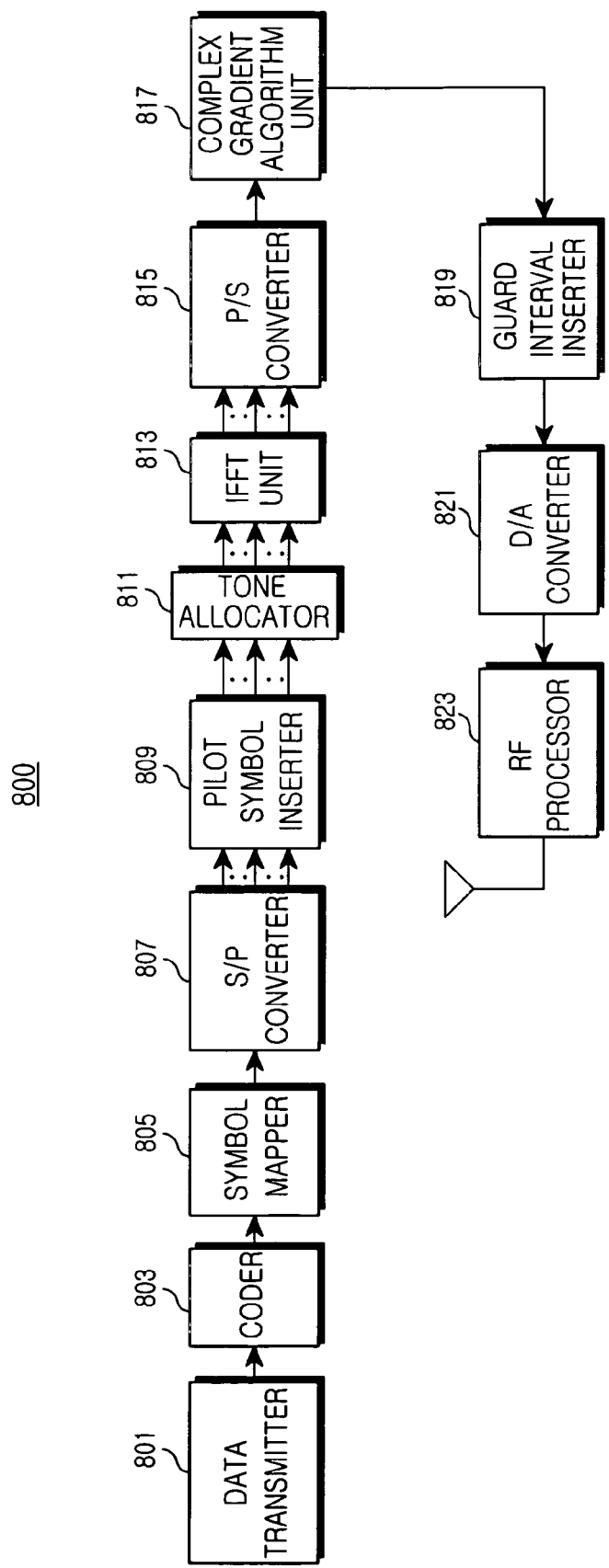
FIG. 8 is a block diagram showing a construction of a transmitter of an OFDM communication system for performing a function according to the present invention.

FIG. 8 is a block diagram showing a construction of a transmitter of an OFDM communication system for performing a function according to the present invention.

Referring to FIG. 8, transmitter 800 includes a data transmitter 801, a coder 803, a symbol mapper 805, a serial to parallel (hereinafter, referred to as "S/P") converter 807, a pilot symbol inserter 809, a tone allocator 811, an IFFT unit 813, a parallel to serial (hereinafter, referred to as "P/S") converter 815, a complex gradient algorithm unit 817, a guard interval inserter 819, a digital to analog (hereinafter referred to as "D/A") converter 821, and an RF processor 823.

In transmitter 800, the data transmitter 801 generates and outputs user data bits and control data bits to be transmitted to the coder 803. The coder 803 receives and codes the signals outputted from the data transmitter 801 according to a corresponding coding scheme, and then outputs the coded signals to the symbol mapper 805. Here, the coder 803 may perform the coding by means of a convolutional coding scheme or a turbo coding scheme having a predetermined coding rate. The symbol mapper 805 modulates the coded bits outputted from the coder 803 according to a corresponding modulation scheme, thereby generating modulation symbols, and outputs the modulation symbols to the S/P converter 807. Here, the modulation scheme by the symbol mapper 805 may follow, e.g., a BPSK (binary phase shift keying) scheme, a QPSK (quadrature phase shift keying) scheme, a 16QAM (quadrature amplitude modulation) scheme, 64QAM scheme, or others.

The S/P converter 807 receives and converts the serial modulation symbols outputted from the symbol mapper 805 into parallel modulation symbols, and outputs the converted parallel modulation symbols to the pilot symbol inserter 809. The pilot symbol inserter 809 inserts pilot symbols into the converted parallel modulation symbols outputted from the serial-parallel converter 807 and then outputs them to the tone allocator 811. The tone allocator 811 allocates the L tones carrying no information to positions reserved in advance and the other signals of the entire N signals except for the L signals to the other positions. The tone allocator 811 allocates the signals in complex number forms according to the present invention. After the tones are allocated, parallel data streams are inputted to the IFFT unit 813.

The IFFT unit 813 receives the signals outputted from the tone allocator 811, performs N-point IFFT for the signals, and then outputs them to the P/S converter 815.

The P/S converter 815 receives the signals outputted from the IFFT unit 813, converts the signals into serial signals, and outputs the converted serial signals to the complex gradient algorithm unit 817. The complex gradient algorithm unit 817 performs the operation as described above with reference to FIG. 5. Then, the complex gradient algorithm unit 817 outputs signals having a minimum PAPR to the guard interval inserter 819. The guard interval inserter 819 receives the signals outputted from the complex gradient algorithm unit 817, inserts guard intervals into the received signals, and then outputs them to the D/A converter 821.

Here, the inserted guard interval prevents interference between OFDM symbols transmitted in the OFDM communication system; that is to say, the inserted guard interval prevents interference between a previous OFDM symbol transmitted during a previous OFDM symbol period and a current OFDM symbol to be transmitted during a current OFDM symbol period. Inserting the guard interval is performed by a cyclic prefix method or a cyclic postfix method.

The D/A converter 821 receives the signals outputted from the guard interval inserter 819, converts the signals into analog signals, and outputs the converted analog signals to the RF processor 823. The RF processor 823 includes a filter and a front end unit. The RF processor 823 receives the signals from the D/A converter 821, RF-processes the signals, and then transmits the signals over the air through a Tx antenna.

As described above, the present invention enables an OFDM mobile communication system to employ a complex gradient algorithm in tone reservation, thereby lowering a peak-to-average ratio while increasing the transmission rate.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for reducing a peak-to-average power ratio (PAPR) in an orthogonal frequency division multiplexing (OFDM) communication system including N carriers, among which L carriers are allocated to L reserved tones and data are carried by (N-L) remaining tones, wherein L is smaller than N, the method comprising the steps of:

(1) generating an impulse signal from the L reserved tones;
   (2) rotating a phase of the generated impulse signal into a phase of a signal having a maximum peak value from among complex output signals obtained through inverse fast Fourier transform (IFFT) of the N carriers;
   (3) scaling the generated impulse signal by the difference between the maximum peak value and a target power value; and
   (4) complex-adding the scaled signal and the complex output signal after IFFT.

2. A method as claimed in claim 1, further comprising a step (5) of comparing a PAPR obtained through complex-adding in step (4) with a target PAPR set in advance.

3. A method as claimed in claim 2, wherein, as a result of the comparison, when the PAPR obtained through complex-adding in step (4) does not meet the target PAPR, steps (2) through (5) are repeated for the generated impulse signal.

4. A method as claimed in claim 1, wherein the impulse signal generated from the L reserved tones is a complex signal.

5. A method as claimed in claim 1, wherein each of the (N-L) tones carrying data is a complex signal.

6. A method as claimed in claim 1, wherein, in step (2), the phase is converted on a complex plane.

7. A method as claimed in claim 1, wherein, in step (2), phase rotation is executed in order to cause the phase of the generated impulse signal to coincide with the phase of the signal having the maximum peak value, and is determined by complex multiplying the signal generated from the L reserved tones by the normalized signal having the maximum peak value from among the complex output signals obtained through IFFT of the N carriers.

8. An apparatus for reducing a peak-to-average power ratio (PAPR) in an orthogonal frequency division multiplexing (OFDM) communication system including N carriers, among which L carriers are allocated to L reserved tones and data is carried by (N-L) remaining tones, wherein L is smaller than N, the apparatus comprising a complex gradient algorithm unit, which generates an impulse signal from the L reserved tones, phase-shifts the impulse signal, scales the impulse signal, and complex-operates the impulse signal with a complex output signal obtained though IFFT of the N carriers, thereby lowering a maximum peak value from among complex output signals below a target power value.

9. An apparatus as claimed in claim 8, wherein the complex gradient algorithm unit comprises:

a phase rotator for rotating a phase of the generated impulse signal into a phase of a signal having a maximum peak value from among complex output signals obtained through IFFT of the N carriers;

a scaling unit for scaling the generated impulse signal by the difference between the maximum peak value and a target power value; and a complex adder for complex-adding the scaled signal and the complex output signal after IFFT.

10. An apparatus as claimed in claim 9, wherein the complex gradient algorithm unit further comprises a peak detector for detecting a maximum peak value of the complex signal outputted after the IFFT.

11. An apparatus as claimed in claim 9, wherein the complex gradient algorithm unit further comprises a PAPR calculation unit for calculating a PAPR of an output of the complex adder.

12. An apparatus as claimed in claim 11, wherein the complex gradient calculation unit further comprises a control unit for controlling an output of a signal by comparing an output of the PAPR calculation unit with a predetermined target power value.

* * * * *